United States Patent
Kagerer et al.

(10) Patent No.: US 10,214,209 B2
(45) Date of Patent: Feb. 26, 2019

(54) DRIVER ASSISTANCE SYSTEM IN A MOTOR VEHICLE

(71) Applicant: Bayerische Motoren Werke Aktiengesellschaft, Munich (DE)

(72) Inventors: Walter Kagerer, Munich (DE); Stefan Knoller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/422,524

(22) Filed: Feb. 2, 2017

(65) Prior Publication Data

US 2017/0144660 A1 May 25, 2017

Related U.S. Application Data

(63) Continuation of application No. PCT/EP2015/068182, filed on Aug. 6, 2015.

(30) Foreign Application Priority Data

Aug. 7, 2014 (DE) ................ 10 2014 215 671

(51) Int. Cl.
*B60W 30/14* (2006.01)
*B60W 10/04* (2006.01)
(Continued)

(52) U.S. Cl.
CPC ........... *B60W 30/14* (2013.01); *B60W 10/04* (2013.01); *B60W 10/10* (2013.01);
(Continued)

(58) Field of Classification Search
CPC ...... B60W 10/04; B60W 10/10; B60W 30/14; B60W 40/105; B60W 50/0097; B60W 2540/04; B60W 2550/22; B60W 2720/106

See application file for complete search history.

(56) References Cited

U.S. PATENT DOCUMENTS

2010/0211247 A1* 8/2010 Sherony ............ B60W 30/1882
   701/31.4
2014/0088849 A1* 3/2014 Ham ................ B60W 30/143
   701/70

(Continued)

FOREIGN PATENT DOCUMENTS

DE   10 2007 005 245 A1   11/2007
DE   10 2008 018 421 A1   9/2009
(Continued)

OTHER PUBLICATIONS

International Search Report (PCT/ISA/210) issued in PCT Application No. PCT/EP2015/068182 dated Mar. 16, 2016 with English translation (Four (4) pages).

(Continued)

*Primary Examiner* — Huan Le
(74) *Attorney, Agent, or Firm* — Crowell & Moring LLP

(57) ABSTRACT

A driver assistance system in a motor vehicle includes a detection system for detecting upcoming events which permit an increase in current speed as a result of the lifting of a restriction on a currently valid speed, a functional unit for determining an acceleration strategy for increasing the speed, and an information system for issuing request information to the driver to allow automatic implementation of the acceleration strategy. The functional unit initiates the automatic implementation of the acceleration strategy upon confirmation by the driver of the request information. The request information can be issued to the driver already at a defined point in time before the upcoming event that lifts the restriction on the current speed. If the driver confirms the request information before the upcoming event that lifts the restriction on the current speed has been reached, the functional unit initiates an acceleration strategy that is composed of two-stages.

17 Claims, 2 Drawing Sheets

(51) Int. Cl.
  *B60W 10/10* (2012.01)
  *B60W 50/00* (2006.01)
  *B60W 50/14* (2012.01)

(52) U.S. Cl.
  CPC ........ *B60W 50/0097* (2013.01); *B60W 50/14* (2013.01); *B60W 2540/04* (2013.01); *B60W 2550/22* (2013.01); *B60W 2720/106* (2013.01)

(56) References Cited

U.S. PATENT DOCUMENTS

| | | | |
|---|---|---|---|
| 2014/0371974 A1* | 12/2014 | Huelsebusch | B60K 31/0008 701/23 |
| 2015/0298699 A1 | 10/2015 | Poechmueller et al. | |
| 2016/0355182 A1* | 12/2016 | Remillard | B60W 30/14 |

FOREIGN PATENT DOCUMENTS

| | | |
|---|---|---|
| DE | 10 2013 003 215 A1 | 9/2013 |
| DE | 10 2012 211 967 A1 | 1/2014 |
| DE | 10 2012 213 321 A1 | 1/2014 |
| DE | 10 2013 205 218 A1 | 9/2014 |

OTHER PUBLICATIONS

German-language Written Opinion (PCT/ISA/237) issued in PCT Application No. PCT/EP2015/068182 dated Mar. 16, 2016 (Five (5) pages).

German-language Search Report issued in counterpart German Application No. 10 2014 215 671.8 dated May 25, 2015 with partial English translation (Twelve (12) pages).

* cited by examiner

DRIVER ASSISTANCE SYSTEM IN A MOTOR VEHICLE

CROSS REFERENCE TO RELATED APPLICATIONS

This application is a continuation of PCT International Application No. PCT/EP2015/068182, filed Aug. 6, 2015, which claims priority under 35 U.S.C. § 119 from German Patent Application No. 10 2014 215 671.8, filed Aug. 7, 2014, the entire disclosures of which are herein expressly incorporated by reference.

BACKGROUND AND SUMMARY OF THE INVENTION

The invention relates to a driver assistance system in a motor vehicle for determining an acceleration strategy and for automatically implementing the acceleration strategy.

In principle, many driver assistance systems configured as a speed control system are already known that regulate the speed of the motor vehicle to a prescribed desired or setpoint speed. Besides these longitudinal control systems, it is today already possible to purchase even longitudinal control systems extended by distance control, what are known as distance-based longitudinal control systems or speed control systems, from some manufacturers. Systems of this kind that are provided—for example by the applicant of the present patent application under the name "Active Cruise Control"—allow the motor vehicle to be driven automatically at a desired or correspondingly lower speed while maintaining a desired distance from a vehicle travelling in front. When a distance sensor system fitted to the motor vehicle, which distance sensor system can operate particularly on a radar basis, detects a target object or (motor) vehicle travelling in front in its own lane, its own speed is matched—for example by prompting a suitable braking torque—to the speed of the motor vehicle travelling in front or the target object. This is done such that distance control in the "active speed-of-travel control" or the relevant longitudinal control system automatically regulates and maintains a situation-appropriate distance from the motor vehicle or target object travelling ahead. Termination of the subsequent travel is followed by acceleration to the prescribed desired speed again.

Further, what are known as speed limiting systems are known that prevent the speed selected by the driver from being exceeded.

DE 10 2012 211 967 A1 describes a combination of a speed limiting system and a speed control system, wherein the maximum speed of the speed limiting system instead of the selected set speed is adoptable as a (new) setpoint speed for the speed control.

Finally, in more recent vehicles, there are also driver assistance systems that can predictively identify a speed restriction, either from map data of a navigation system and/or by means of image processing, and continuously display it to the driver, so that the driver can independently match his speed to the speed restriction as required (e.g. BMW Speed Limit Info).

DE 10 2008 018 421 A1 discloses a driver assistance system for sending and receiving speed data and/or traffic density data for controlling a speed control system, which driver assistance system takes the received data as a basis for determining an admissible maximum speed and communicates the latter to the driver by outputting an appropriate notification. The driver can adopt this stipulation of the admissible speed for his speed control system by means of simple operation. Similarly, when the speed limit is left, this is displayed to the driver.

It is thus an object of the invention to provide a driver assistance system that, on termination of a speed limit, determines and if need be implements an acceleration strategy that is agreeable and comprehensible to the driver.

This and other objects are achieved by a driver assistance system in accordance with embodiments of the invention.

The driver assistance system according to the invention essentially comprises three core elements:
  a detection system for identifying events ahead that, on account of a currently valid speed limit being lifted, allow the current speed to be increased (to a new higher target speed),
  a notification system for outputting a request notification to the driver for allowing the acceleration strategy to be automatically implemented, and
  a functional unit for determining an acceleration strategy for increasing the speed.

Only when the driver allows the automatic implementation of the acceleration strategy by appropriately acknowledging the request notification does the functional unit prompt the automatic implementation of the acceleration strategy by transmitting appropriate control signals to the drive and/or braking unit.

The relevant events ahead that allow the current speed to be increased can be identified either from map data of a navigation system and/or by use of image processing by a predictive sensor system and/or by way of a Car-to-X communication unit by virtue of reception of relevant data from other vehicles or from road signs or traffic control systems. The events ahead may therefore be, by way of example, the lifting of temporary or permanent speed restrictions that are either indicated directly on a road sign or can be derived from the general traffic rules on the basis thereof (e.g. a speed restriction of 50 km/h applies in Germany for travelling through a town). The target speed definitive for the acceleration strategy based on the location of the event ahead may be either the (higher) maximum permitted speed following the sign lifting the restriction (the "derestriction sign") or a speed that differs upward or downward by a prescribed magnitude, the magnitude and the direction of the difference possibly being selectable by the driver in a central vehicle menu, for example. Similarly, the speed to be reached may also be a desired or setpoint speed prescribed by the driver, particularly when the desired or setpoint speed prescribed by the driver is lower than a maximum speed permitted after the event that lifts the current speed limit.

In the case of the invention, it is assumed that the vehicle initially either moves at an appropriate restricted initial speed on account of an active speed limiter (e.g. Speed Limit Device) that takes into consideration the speed limit or at the appropriate initial speed on account of an active, generally known speed controller (e.g. ACC).

The invention is further based on the principle that when a future termination of a speed limit is identified in advance, an offer of automatic speed increase can fundamentally be made only in a very restricted manner, since it is always necessary to ensure that within the range of the (still existing) speed limit it is not possible (or only very slightly possible) to exceed the admissible maximum speed on the basis of the traffic rules. Further, however, it is also known that a normal driver accelerates his vehicle slightly before actually reaching the derestriction sign and, after the derestriction sign, wants to quickly reach the new admissible maximum speed or his desired speed by means of appropriate pedal operation.

Taking the above insight into consideration, the invention provides that the request notification is outputable to the driver at a defined time before the event ahead that lifts the current speed limit is actually reached, and the functional unit, on acknowledgement of the request notification, prompts an acceleration strategy, which is set up as a two-stage acceleration strategy, before the event ahead that lifts the current speed limit is reached. Before actually reaching the event that lifts the speed limit, the functional unit determines an appropriate acceleration strategy that, when automatic implementation before the relevant event is desired by the driver, firstly shows an acceleration behavior that is comprehensible to the driver, but at the same time also takes account of the existing traffic rules in a comprehensible manner. To this end, the invention initially involves determining, as an acceleration strategy, a two-stage acceleration strategy that is implemented at least in a matched form if the driver acknowledges the request notification before the event ahead that lifts the current speed limit is reached. Advantageously, this involves a smaller acceleration being prompted in the first stage of the two-stage acceleration strategy than in the second stage of the two-stage acceleration strategy.

Further, the acceleration strategy is advantageously set up such that the first stage of the two-stage acceleration strategy is implemented up to the location of the event ahead at which the currently valid speed limit is lifted and the second stage of the two-stage acceleration strategy is implemented only from when the event ahead at which the currently valid speed limit is lifted is reached. In other words, at the location of the event ahead at which the currently valid speed limit is lifted, there is therefore a changeover from the first acceleration program (=first stage of the two-stage acceleration strategy) to a second acceleration program (=second stage of the two-stage acceleration strategy). The first acceleration program contains mapping showing that the offer to increase speed is made only an applicable distance before the derestriction sign. If the driver then allows automatic implementation of the acceleration strategy by means of appropriate control element operation, the acceleration is selected exactly such that at the location of the derestriction sign the speed limit ending at that location is exceeded only by a small—possibly selectable—magnitude. The second acceleration program is, by contrast, selected after the derestriction sign such that the acceleration to the new target speed is firstly effected comfortably, but at the same time the speed difference is also regulated as quickly as possible. With an appropriately chosen acceleration in the two acceleration programs, it is therefore possible to ensure that the driver already experiences slight acceleration of the vehicle up to the derestriction sign, and acceleration of the vehicle to the new, higher target speed is performed only from the derestriction sign onward.

Advantageously, the defined time at which the request notification is output is determined and accordingly output on the basis of prescribed parameters, particularly on the basis of the distance from the location of the event ahead and/or on the basis of the speed difference from the current speed, or the maximum speed allowed on the basis of the speed limit, and a target speed permitted or desired after the speed limit has been lifted. In particular, the defined time at which the request notification is output can be prescribed such that the request notification is output at a prescribed distance from the location of the event ahead, so that on acknowledgement by the driver it is possible for automatic implementation of the acceleration strategy to be effected.

As already mentioned above, in a further advantageous refinement of the invention, in the first stage of the two-stage acceleration strategy, an acceleration is prompted such that the speed limit lifted at the location of the event ahead is exceeded only by a prescribed, advantageously adjustable, small speed magnitude at said location. The possibly selectable speed offset can be chosen, by way of example, by means of a central operator control element using an appropriate choice of offset, so that it can be used for all further acceleration strategies. If desired, it is also possible to select that at the location of the event ahead, the speed limit lifted at that location is not yet exceeded.

In contrast to the acceleration in the first stage, in the second stage of the two-stage acceleration strategy, an acceleration can be prompted such that a target speed permitted or desired after the speed limit has been lifted is reached within the shortest possible time or within a prescribed time window, a prescribed maximum acceleration advantageously not being able to be exceeded. Advantageously, in the second stage of the two-stage acceleration strategy, the acceleration can in this case be prescribed on the basis of the speed difference from the current speed and a target speed permitted or desired after the speed limit has been lifted and/or on the basis of a current mode of operation of the vehicle (e.g. sports mode, comfort mode or ECO mode).

Advantageously, as part of the two-stage acceleration strategy, stipulation of the acceleration can also take into consideration possible action in the transmission control, so that prescribed or desired transmission control is maintained. As such, in the first stage of the two-stage acceleration strategy, an acceleration can be requested such that a downshift in the transmission of the vehicle is avoided or such action is taken in the transmission control of the vehicle as to prevent a downshift request, possibly present on account of the acceleration requirement. By contrast, in the second stage of the two-stage acceleration strategy, such an acceleration can be requested as to request and implement a downshift in the transmission, i.e. an acceleration that requires a downshift in the transmission is deliberately requested. Hence, the first acceleration is provided gently and a corresponding dynamic impression is supported by the downshift only at the location of the event ahead (on transition to the second acceleration stage).

In principle, determination of the acceleration strategy can take into consideration not only the critical constraints, such as e.g. speed difference between the current speed and the target speed, distance from the location of critical events ahead and/or desired target speed, but also further criteria that have an influence on the acceleration action of the vehicle. The influencing factors may particularly be current influencing factors, but it is also possible to take into consideration already known influencing factors, influencing factors occurring in the future and influencing factors influencing acceleration that will occur up to the location of the event ahead or in the subsequent acceleration phase. By way of example, they may be road inclination, wind conditions and other weather conditions, the current loading of the vehicle, or the like.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
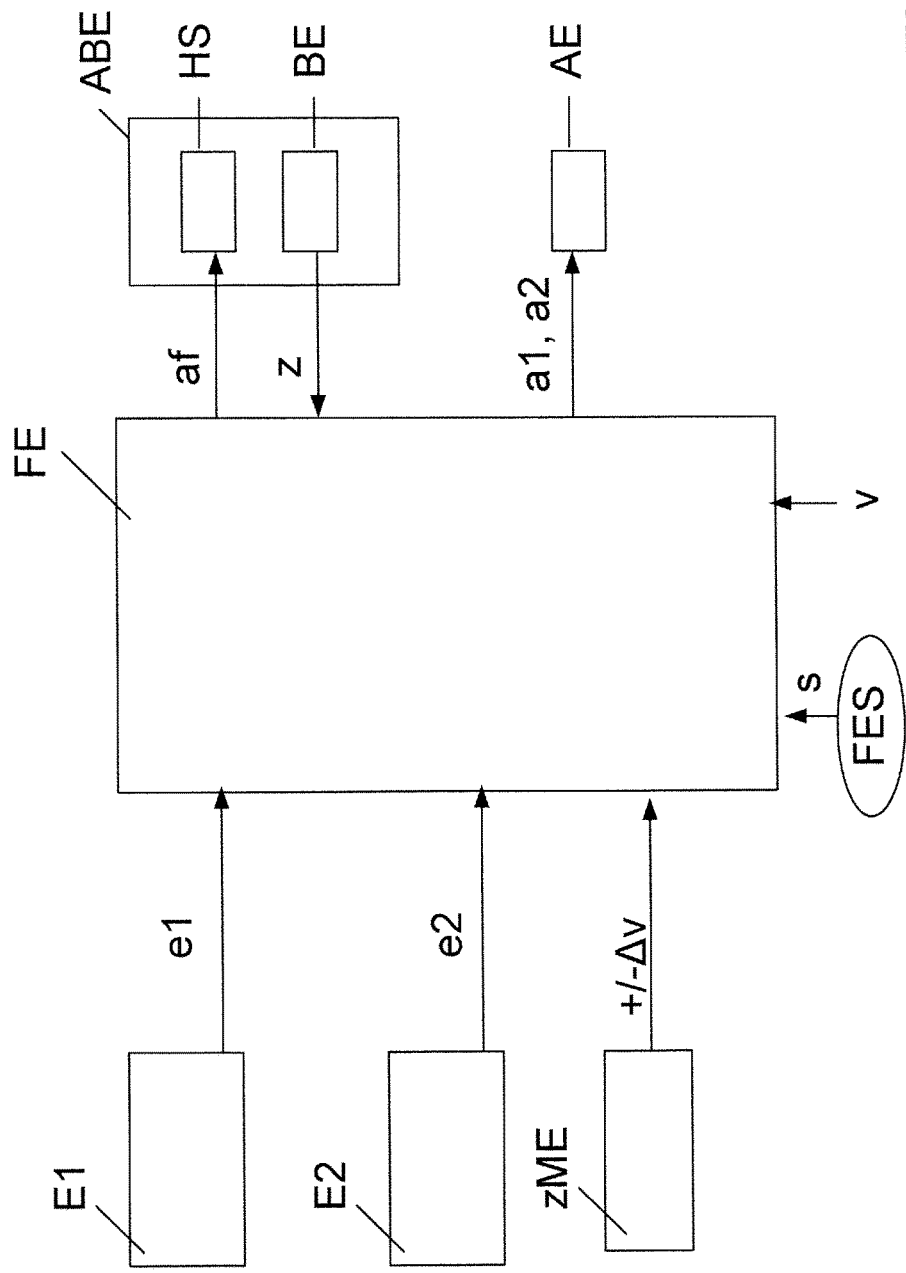
FIG. 1 is a schematic block diagram of an exemplary driver assistance system in a motor vehicle for determining an acceleration strategy and automatically implementing the acceleration strategy.

In detail, FIG. 1 shows, as a central element of the driver assistance system, a functional unit FE that receives input signals e1 from a first detection unit E1, input signals e2 from a second detection unit E2, a speed signal v, a status signal s from a driving experience switch FES and an authorization signal z for allowing a determined acceleration strategy to be automatically implemented.

The first detection unit E1 may be, by way of example, a (video) sensor system fitted to the vehicle and oriented toward the front, which detects events ahead that lift the speed restriction and allow the current speed to be increased to a higher target speed. The second detection unit E2 may be, by way of example, a vehicle-internal navigation system that takes the known position of the vehicle and a section of road ahead as a basis for identifying events ahead that lift a speed restriction. Both the first detection unit E1 and the second detection unit E2 are configured such that they can firstly identify the location of the event ahead that lifts a speed restriction, that is to say including the actual speed restriction, and can forward said location to the functional unit FE. Ideally, the detection units E1 or E2 also identify a new admissible maximum speed that applies after the current speed limit has been lifted. Alternatively, instead of the new allowed maximum speed, a desired (new) maximum speed prescribed by the driver can also be transmitted to the functional unit FE.

Further, the functional unit FE receives from a central menu unit zME arranged in the vehicle a signal+/−Δv that indicates with what upward or downward difference prescribed by the driver it is possible to determine from the actual speed restriction on the derestriction sign the speed to be reached at the location of the event lifting the speed limit. This stipulation can be altered by the driver at any time.

Finally, the functional unit FE also receives further relevant data s from which it can determine what driving mode is currently selected. As an example, the functional unit FE in this case is connected to what is known as a driving experience switch FES that the driver can use to select a mode of operation for the vehicle. If the driver has selected sport mode, for example, then he fundamentally desires faster acceleration and possibly also greater excess speed over the permitted maximum speed at the location of the sign lifting the restriction (the "derestriction sign") than if the driver has selected what is known as an eco mode, in which he wishes to drive and also accelerate in a particularly consumption-saving manner.

As soon as the functional unit FE has relevant data e1 and/or e2 available about an event ahead lifting a speed restriction and information available about the new target speed desired after the derestriction sign, the functional unit FE can initially take into consideration the driver stipulation from the central menu unit zME in order to determine the (intermediate) target speed at the location of the event ahead and can subsequently take the permitted acceleration in a first acceleration stage, which is intended to be implemented up until the derestriction sign is reached, as a basis for determining an ideal time for the output of a request notification for allowing the acceleration strategy to be automatically implemented.

On the basis of the determined time or the distance from the derestriction sign, the functional unit FE prompts output of a request signal by way of an appropriate signal of to a display operating unit ABE that comprises a notification system HS and an operating element BE. At the same time, the functional unit FE continually adapts the first stage of the two-stage acceleration strategy from the time at which the request notification is output, so that even when the distance becomes continually shorter or the current speed v alters, the (intermediate) target speed can be reached at the location of the event ahead.

As soon as the driver acknowledges the request signal by operating the operating element BE, the display operating unit ABE returns an appropriate "authorization" signal z to the functional unit FE. The functional unit FE then begins to initiate the automatic implementation of the (most recently determined) first stage of the acceleration strategy by prompting an appropriate control signal a1 to the drive unit AE. During the actuation, the prescribed first acceleration of the two-stage acceleration strategy continues to be adapted to the current situation and implemented as appropriate, so that the (intermediate) target speed is reached at the location of the event ahead. If, at the time at which the driver allows the automatic implementation by operating the operating element BE, the distance between the vehicle and the derestriction sign is very short, so that it would be possible to reach the somewhat higher (intermediate) target speed only with great acceleration, then the vehicle can be accelerated only with a smaller acceleration even irrespective of the permitted (intermediate) target speed at the location of the derestriction sign.

As soon as the derestriction sign is reached, the functional unit FE prompts implementation of the (previously) determined second stage of the two-stage acceleration strategy by transmitting a second acceleration signal a2 to the drive unit AE, so that the target speed is reached within an extremely short time in accordance with the needs of the driver and taking into consideration a maximum permitted acceleration.

Figure 2:
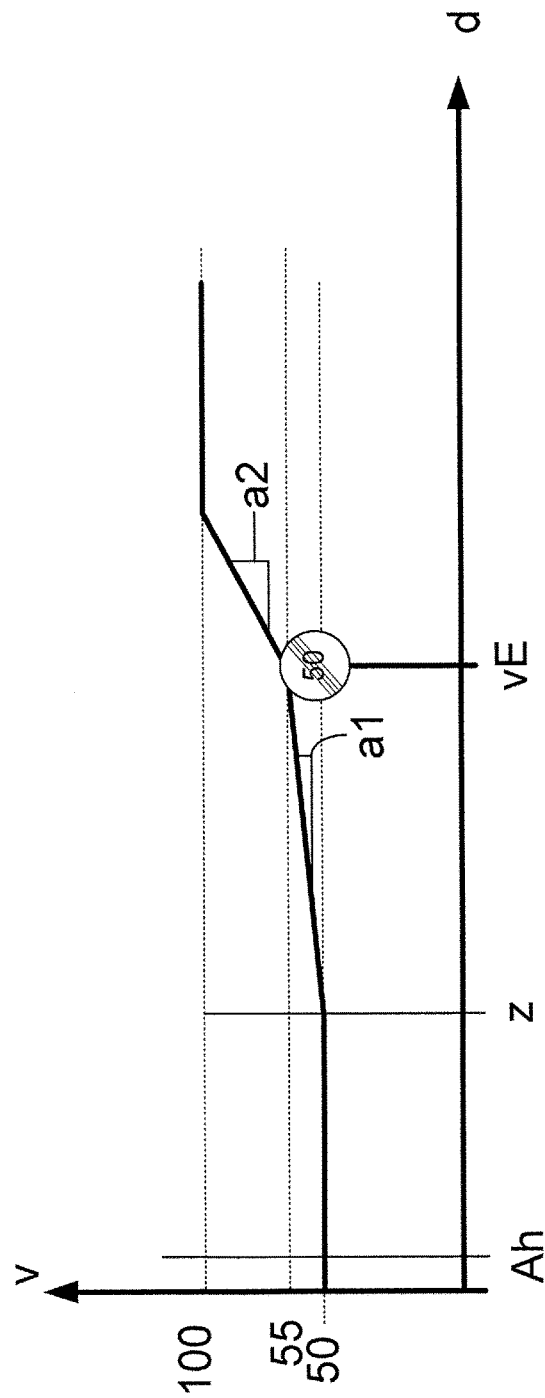
FIG. 2 is a graphical example of an determined and automatically implemented acceleration strategy.

The description below pertaining to FIG. 2 is now used to present an example of an implemented two-stage acceleration strategy. FIG. 2 shows a distance d, with a derestriction sign for a speed restriction of 50 km/h being arranged at the location vE. After the derestriction sign, the aim is to travel at a target speed of 100 km/h prescribed by the driver.

Further, it is assumed that the vehicle approaching the derestriction sign moves at a constant speed of 50 km/h. For the sake of completeness, it is pointed out that at this time the vehicle moves either at the corresponding initial speed of 50 km/h on the basis of an active speed limiter (e.g. Speed Limit Device) taking account of the speed limit or at this speed on the basis of an active speed controller (e.g. ACC) taking account of the speed limit.

At the time at which the vehicle has reached the position "Ah" (defined by stipulation of a distance from the derestriction sign), an appropriate request notification is output to the driver, which, when acknowledged, prompts automatic implementation of the determined two-stage acceleration strategy to be implemented. The automatic implementation is allowed at the indicated location "z".

After the driver has allowed the automatic implementation, the vehicle initially accelerates with a prescribed first acceleration a1, so that a small excess over the admissible maximum speed (still 50 km/h) is reached at the location vE of the derestriction sign. From the location vE of the derestriction sign onward, the functional unit changes from the first acceleration stage to the second acceleration stage. During this second acceleration stage, the vehicle is accelerated with an acceleration a2 that is increased in comparison with the first acceleration a1, so that the desired target speed of 100 km/h is reached within a very short time. The level of the second acceleration a2 can be prescribed either permanently or on the basis of the current mode of operation.

The driver assistance system described here allows the driver to be presented with the offer of automatic acceleration of the vehicle to the target speed applying in future in very good time, that is to say before the derestriction sign is reached, without the current speed limit being substantially exceeded before the actual derestriction. Hence, the driving behavior of an average driver can be reproduced in optimum fashion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system in a motor vehicle, comprising:
   a detection system that identifies upcoming events which permit an increase in current speed as a result of a lifting of a restriction on a currently valid speed;
   a functional unit that determines an acceleration strategy for increasing the current speed;
   a notification system that outputs a request notification to a driver to allow automatic implementation of the acceleration strategy, wherein
      the functional unit initiates the automatic implementation of the acceleration strategy upon confirmation by the driver of the request notification,
      the request notification is output to the driver at a defined time before the upcoming event that lifts the restriction on the current speed, and
      if the driver confirms the request notification before the upcoming event that lifts the restriction on the current speed has been reached, the functional unit initiates an acceleration strategy that is composed of two-stages.

2. The driver assistance system according to claim 1, wherein
   a smaller acceleration is prompted in a first stage of the two-stage acceleration strategy than in a second stage.

3. The driver assistance system according to claim 2, wherein
   the first stage of the two-stage acceleration strategy is implemented up to a location of the upcoming event that lifts the restriction on the currently valid speed.

4. The driver assistance system according to claim 3, wherein
   a second stage of the two-stage acceleration strategy is implemented upon reaching the upcoming event that lifts the restriction on the currently valid speed.

5. The driver assistance system according to claim 2, wherein
   a second stage of the two-stage acceleration strategy is implemented upon reaching the upcoming event that lifts the restriction on the currently valid speed.

6. The driver assistance system according to claim 1, wherein
   a second stage of the two-stage acceleration strategy is implemented upon reaching the upcoming event that lifts the restriction on the currently valid speed.

7. The driver assistance system according to claim 1, wherein
   a defined time at which the request notification is output is determined based on prescribed parameters.

8. The driver assistance system according to claim 7, wherein the prescribed parameters comprise one or more of:
   a distance from a location of the upcoming event,
   a speed difference from the current speed or a maximum speed allowed based on a speed limit and a target speed permitted or desired after the restriction on the currently valid speed has been lifted.

9. The driver assistance system according to claim 1, wherein
   the defined time at which the request notification is output is prescribed such that the request notification is output at a prescribed distance from a location of the upcoming event.

10. The driver assistance system according to claim 1, wherein
    in a first stage of the two-stage acceleration strategy, an acceleration is prompted such that a speed limit lifted at a location of the upcoming event is exceeded by a predefined magnitude at said location.

11. The driver assistance system according to claim 10, wherein the predefined magnitude is adjustable.

12. The driver assistance system according to claim 10, wherein
    in the second stage of the two-stage acceleration strategy, an acceleration is prompted such that a target speed permitted or desired after the speed limit has been lifted is reached within a shortest possible time or within a prescribed time window.

13. The driver assistance system according to claim 12, wherein the acceleration is such that a predefined maximum acceleration is not to be exceeded.

14. The driver assistance system according to claim 1, wherein
    in the second stage of the two-stage acceleration strategy, an acceleration is prescribed based on a speed difference from the current speed and a target speed permitted or desired after a speed limit has been lifted, and/or on the basis of a current mode of operating the motor vehicle.

15. The driver assistance system according to claim 1, wherein
    in the first stage of the two-stage acceleration strategy, an acceleration is requested such that a downshift in a transmission of the motor vehicle is avoided or an action is taken in a transmission control of the motor vehicle to prevent a downshift request.

16. The driver assistance system according to claim 15, wherein
    in the second stage of the two-stage acceleration strategy, an acceleration is requested so as to implement a downshift in the transmission.

17. The driver assistance system according to claim 1, wherein
    the functional unit takes into account currently available environmental information and/or future environmental information when determining the acceleration strategy.

* * * * *